Nov. 8, 1960  W. E. SLAVENS ET AL  2,958,993
CROP HARVESTER MOUNTING

Filed June 19, 1957  5 Sheets-Sheet 2

INVENTORS
W. E. SLAVENS
E. W. ADOLPHSON
BY
ATTORNEYS

Nov. 8, 1960

W. E. SLAVENS ET AL 2,958,993

CROP HARVESTER MOUNTING

Filed June 19, 1957

INVENTORS
W. E. SLAVENS
E. W. ADOLPHSON

BY
C. F. Parker and W. A. Murray
ATTORNEYS

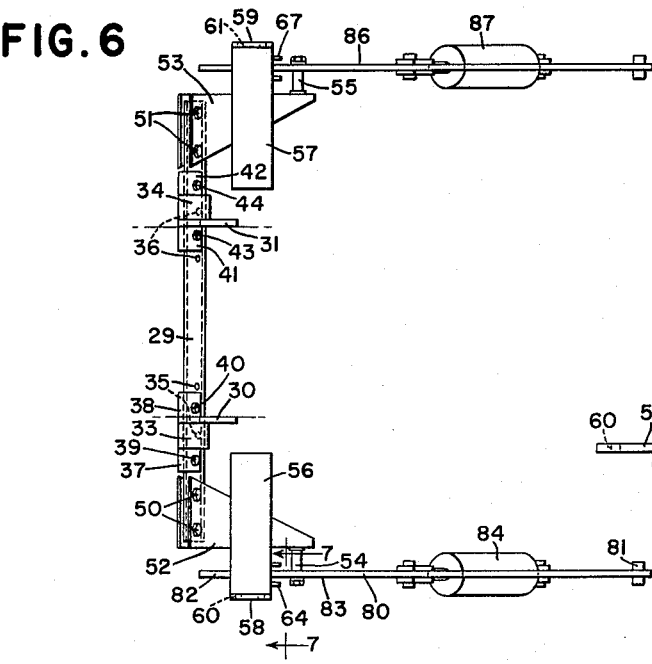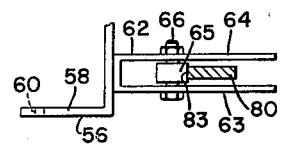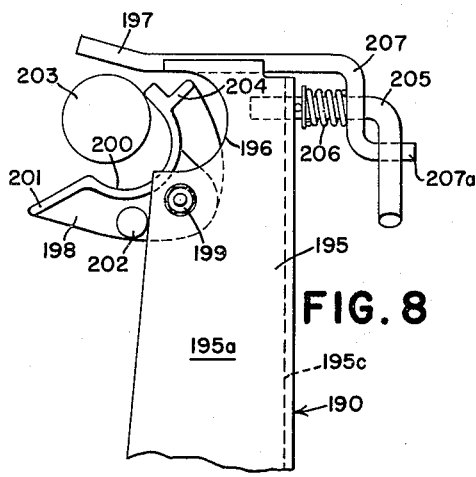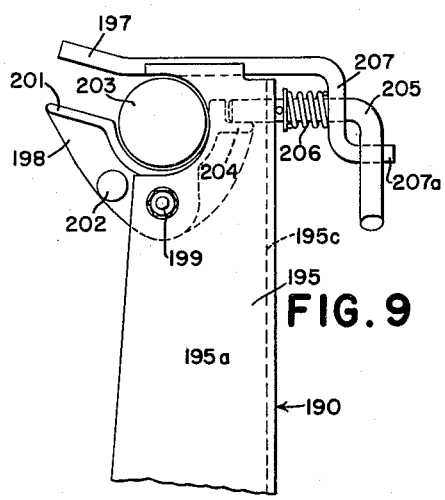

United States Patent Office 2,958,993
Patented Nov. 8, 1960

2,958,993

CROP HARVESTER MOUNTING

Wayne E. Slavens and Evert W. Adolphson, Des Moines, Iowa, assignors, by mesne assignments, to Deere & Company, a corporation of Delaware Filed June 19, 1957, Ser. No. 666,670

9 Claims. (Cl. 56—15)

This invention relates to a corn harvester and more particularly to the location of the various elements of the corn harvester on a tractor or other type of mobile frame and to the specific manner in which the various parts of the harvester are mounted thereon.

The present day conventional corn harvester comprises basically a supporting frame having forwardly positioned corn harvesting elements, usually in the form of cooperating rotatable snapping rolls, and a husking unit directly to the rear of the harvesting elements which receive the ears harvested by the rotatable rolls. Both are normally mounted alongside the tractor body in fore-and-aft alinement.

It has become apparent recently, that there are some advantages of rearranging the harvesting elements relative to the tractor in order to both increase the capacity as well as the operational efficiency of the harvester. The type of corn harvester, herein to be described features a rigid forwardly extending harvester section having a stalk receiving portion forward of the tractor rear axle and a rear crop discharging portion which feeds the corn to a rigid rear harvester section rearward of the axle. Specifically, for purposes of illustration, the forward rigid section will be in the form of the harvesting or row unit and the rear section will be in the form of the husking unit. The forward or harvesting section will be positioned at the side of the tractor. The husking unit or rear section will be supported in cantilever fashion from the tractor body and rearwardly of the rear axle.

It is the primary object of this invention to provide a new and novel mounting arrangement for the various elements of a corn harvester.

It is a further object of this invention to provide a mounting arrangement for one portion of the corn harvester which incorporate the use of a position responsive hydraulic system of a tractor so that a shock load by that portion created by a sudden depression in the ground or other obstruction in the field will not injure or over strain the tractor or its connections to the portion.

It is also an object of this invention to provide a corn harvester, the elements of which are easily mounted on and dismounted from the tractor.

It is still a further object of the invention to provide a mounting arrangement which permits a rear rigid portion of the harvester to be cantilevered from the rear of the tractor and to move vertically automatically in response to shock or overload, and mounting arrangement between the tractor and forwardly extending row or harvesting units, which are connected to the rear rigid portion, which will automatically accommodate vertical movement of the rear portion.

Other objects and advantages of the invention will become apparent to those skilled in the art as the nature of the invention is better understood from the following disclosure as shown in the accompanying drawings.

Fig. 5 is a schematic diagram of the hydraulic lift mechanism of the tractor.

Fig. 6 is a plan view of the mounting structure for mounting the forward portion of the row units on the tractor.

Fig. 7 is a sectional view taken along the line 7—7 of Fig. 6.

Fig. 8 is an enlarged side view of the latch connecting the husking and harvesting unit.

Fig. 9 is a view similar to Fig. 7 showing the latch in a different position.

Figure 1:
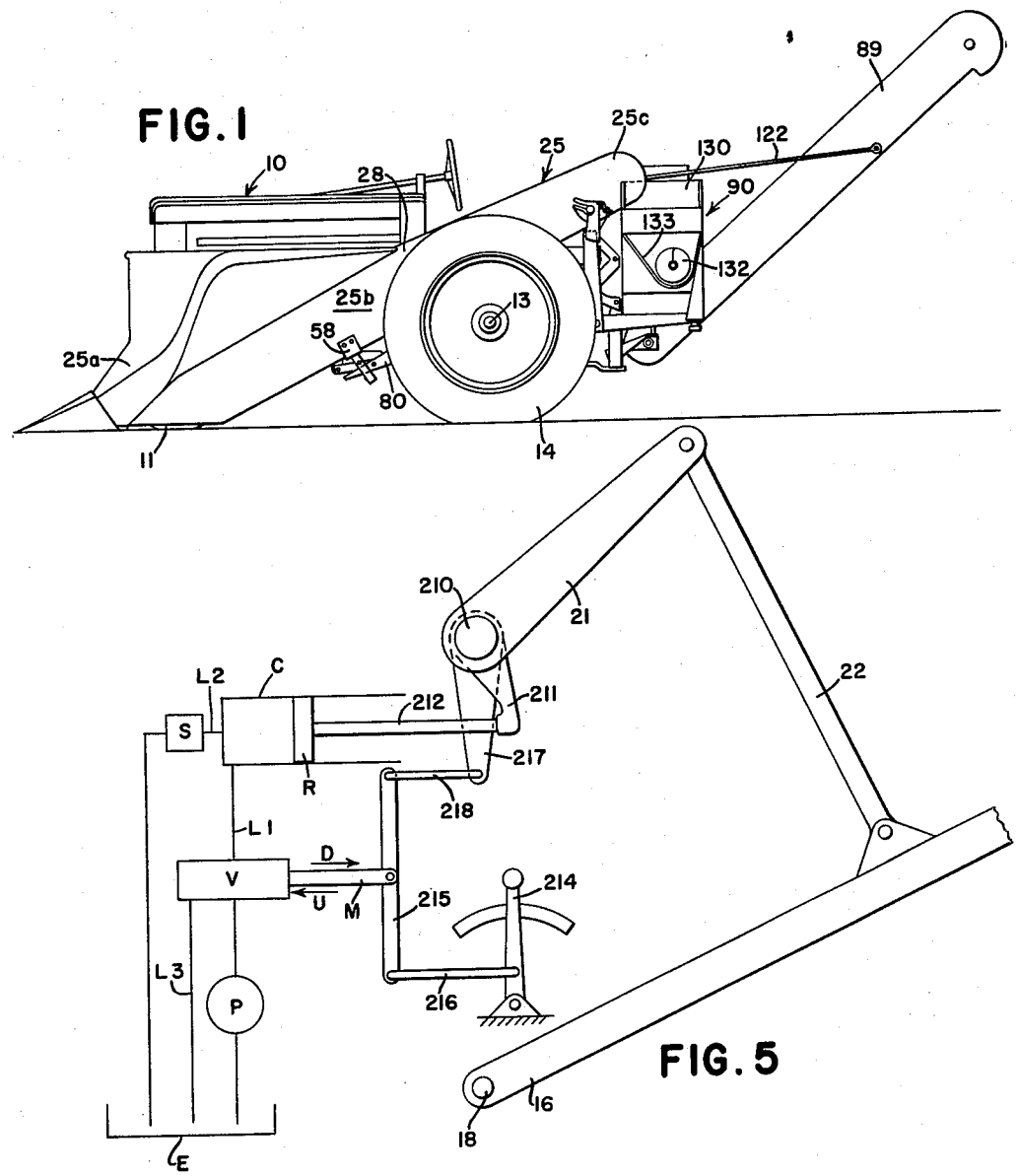
Fig. 1 is a side elevation of a tractor and corn harvester assembly which incorporates the features of the present invention.

The tractor and harvester assembly shown features a tricycle type tractor having a main mobile frame or tractor body 10 supported at its forward end by front steerable wheels 11 and at its rear by a transverse axle 13 carried in an axle housing 19 and having on its outer opposite ends rear wheels 14 and 15 spaced transversely from the tractor body 10. The tractor also features a pair of adjustable elevating trail behind links or levers 16, 17 which are mounted for vertical swinging from forward pivots, the left pivot being shown at 18. Raising or lowering of the links 16, 17 is effected by means of a pair of rock arms, only the left arm of which is shown at 21, which connect the rock arm to the respective trail behind links. An upper stabilizer link 27 operates with the lower trail behind links 16, 17. Hydraulic mechanism, later to be explained, operates to adjust the rock arms and is housed within the housing 23. Also extending rearwardly from the housing 23 is a conventional power take-off shaft 24.

Provided on each side of the tractor body 10 are forwardly extending harvester row units indicated in their entirety by reference numerals 25, 26 respectively. The row units are identical and consequently further description of the units as well as the specific mounting arrangement for each of the row units will be limited to that shown on the left side of the tractor. The row unit 25 has a forwardly positioned stalk receiving portion 25a forward of the rear transverse axle 13, a central portion 25b extending upwardly and rearwardly from the forward portion 25a above the axle means to a rear crop discharging portion 25c rearwardly of the axle 13. The harvesting unit 25 has conventional harvesting mechanism, not shown, which forcibly detaches the ears from the stalks as they move through the harvesting unit and moves the ears rearwardly to the discharge portion 25c. There are several corn harvesters presently on the market which provide harvesting mechanism similar to or for the same purpose as the present harvesting mechanism and consequently details of the mechanism are not important for purposes of fully understanding the present invention.

Supporting means for the forward ends 25a, 26a of the row units 25, 26 is provided at the mid-portion of the tractor. Specifically, a transverse shaft 29 is supported beneath the tractor body 10 by a pair of hanger arms 30, 31 disposed on opposite sides of the tractor respectively. The upper ends of the hanger arms are pivotally mounted on the tractor by means of bolts, the bolt on the left hanger arm 30 being indicated by the reference numeral 32 and the bolt on the right hanger arm not being shown but its location being obvious. The lower end of the arms 30, 31 are provided with flange sleeves 33, 34 for receiving the transverse shaft 29 which, as will become apparent, serves as a forward transverse pivot for the corn harvester units. The shaft 29 is provided with a plurality of axially spaced holes 35, 36 adjacent the lower ends of the hanger arms 30, 31 respectively. A pair of sleeves 37, 38 are positioned adjacent opposite ends of the flange 33 and operate to position the shaft 29 relative to the sleeve 33. The sleeves 37 and 38 are locked in position relative to the shaft 29 by means of bolts 39, 40 which are received in suitable holes or openings 35. A similar pair of sleeves 41, 42 are provided adjacent to the right hanger arm 31 which also serves to hold the lateral position of the shaft 29 relative to the hanger arm 31 by means of bolts 43, 44 which are received in the openings 36. Consequently the shaft 29 is free to rock on the rocker arms 30, 31, but is held against lateral movement on the arm and therefore may be treated as a forward pivotal mounting for the row units 25, 26. Bolted as at 50, 51 to opposite ends of the shaft 29 are bracket assemblies 52, 53, respectively. The rear portion of the bracket assemblies 52, 53 support transverse pivot pins 54, 55. A pair of L-shaped supporting plates 56, 57 are positioned under the respective row units 25, 26. Vertical portions 58, 59 are provided with openings 60, 61 respectively through which the plates are bolted to the row units.

Viewing Fig. 7, a U-shaped bracket 62 is fixed to the lower surface of the L-shaped plate 56 and has depending leg portions 63, 64 which support between the legs a roller member 65 by means of a bolt and nut combination 66. A similar U-shaped bracket 67 is provided on the right side of the tractor and a similar roller assembly, which is not shown, is also provided.

Supported on the axle housing 19 is a depending supporting bracket assembly indicated in its entirety by the reference numeral 70 which includes a rear plate 71 interconnected to a front plate 72 by means of an angle iron 73. The front plate is bolted, as at 74, to the axle housing 19. Projecting forwardly and downwardly from the rear plate 71 is a bracket 75 from the lower end of which is provided a pivot 76. A supporting rod 77 connects the angle iron member 73 and the bracket 75 and serves as reinforcing structure for the bracket. A similar bracket assembly is provided on the right side of the tractor for operation with the right row unit 26.

A lever arm 80 is connected to the forward end of the angle iron support 73 by means of a pivot pin 81. The forward portion of the lever arm 80 is mounted on the transverse pivot pin 54 and has a forwardly extending end section 82 having an upper surface 83 which rides against the roller 65. A hydraulic motor 84 connects a midportion of the lever arm 80 and the lower pivot 76 of the bracket 75 and is operated by a hydraulic pump, not shown, incorporated in the tractor. A similar lever arm 86 and hydraulic motor 87 is provided on the right side of the tractor.

The forward support for the row units operates in the following manner. Extension of the hydraulic units 84, 87 operate to raise the respective levers or arms 80, 86. The levers 80, 86 will move against the roller assemblies carried by the U-brackets 64, 67 to raise the respective row units. The hangers 30, 31 and the stabilizing member or shaft 29 and their respective bracket assemblies at 52 and 53 operate to give lateral stability to the row units while permitting the units to be raised or lowered or to move fore-and-aft on the forward supporting structure.

A crop treating or husking unit indicated in its entirety by the reference numeral 90 is provided at the rear of the tractor and is carried on the tractor solely by the trail-behind links or levers 16, 17. Centrally located relative to the husking unit is a rearwardly projecting wagon elevator 89. Temporary stands, as at 88, are provided to support the husking unit when it is not mounted on the tractor.

While the crop treating unit is shown as a husking mechanism, it should be understood that other and all types of crop treating units could be mounted in a similar manner to the husking unit, the husking unit being chosen only for purposes of illustration. Means for mounting the crop treating unit 90 on the levers 16, 17 comprises basically a rigid frame structure composed of a pair of vertically spaced transverse tubular frame members 91, 92 (Figs. 2 and 3) interconnected at opposite ends by upright structural posts 93, 94 and a pair of central V-shaped metal straps 95, 96. Cantilevered rearwardly from the upright posts 93, 94 are a pair of U-shaped frame members 104, 105 to the rear of which is fixed rigid uprights 106, 107. A pair of axially alined tubular members 97, 98 are fixed to and extend inwardly from the inner legs of the U-shaped frame members to inner upright structural members 99, 100 which in turn have their lower ends interconnected by a rigid tubular member 101. The tubular member 92 and upright members 99, 100 are interconnected by rigid straps 102, 103. Cantilevered rearwardly from the front upright posts 93, 94 are a pair of U-shaped frame members 104, 105 to the rear end of which is fixed rigid uprights 106, 107. As may be seen from Fig. 2 the forward edge of the upright members 106, 107 are shaped to the angle of the rear housing plate of the husking unit 90 and as may be seen in Fig. 4, the U-shaped channel member is formed to support the lower panel of the husking unit. The upright supports 106, 107 are fixed to the husking unit by bolts, as at 108, 109, or other suitable means.

Figure 2:
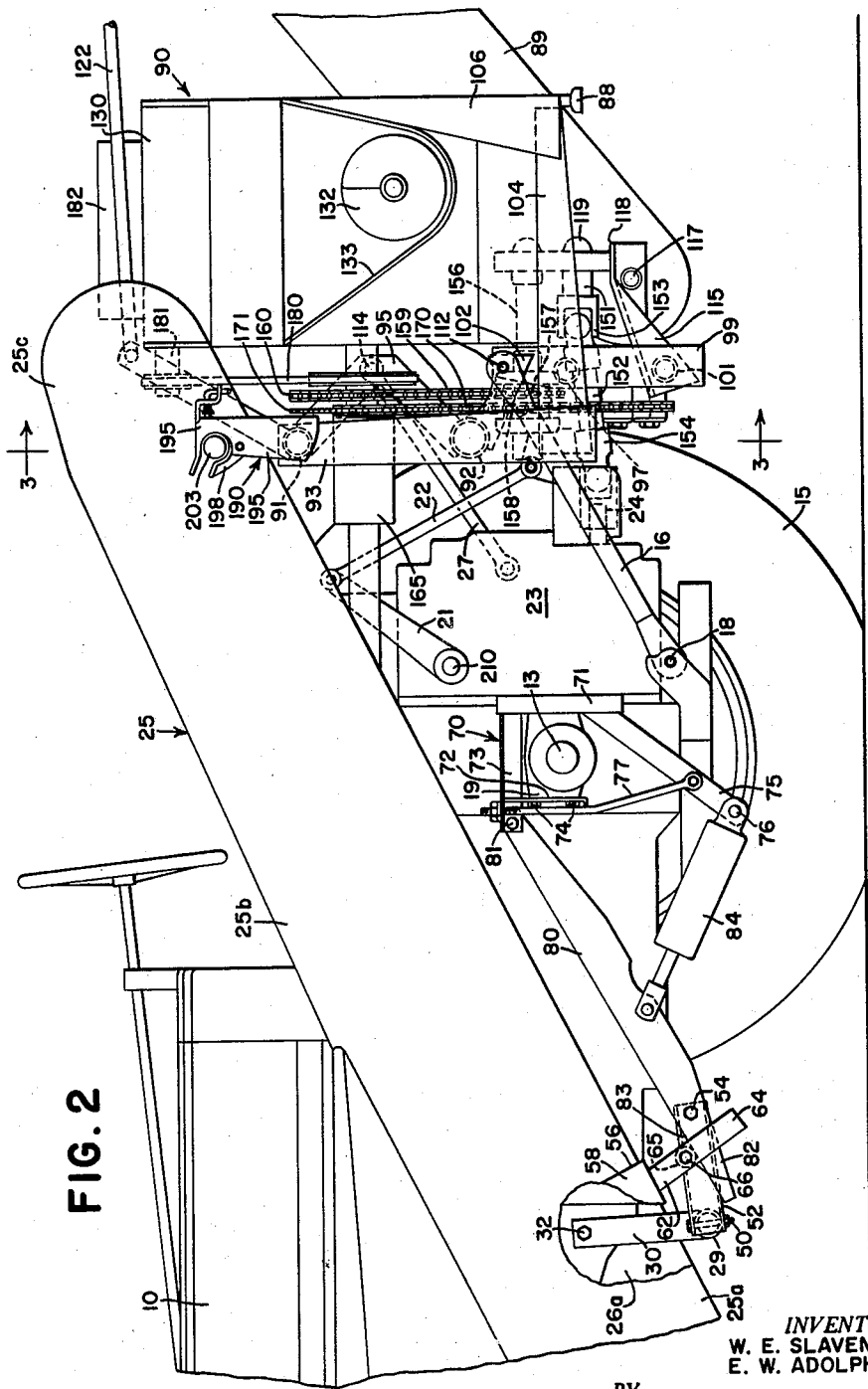
Fig. 2 is an enlarged side elevation of the central portion of the tractor and the corn harvester assembly with portions of the corn harvester and tractor removed for purposes of clarification.
Figure 3:
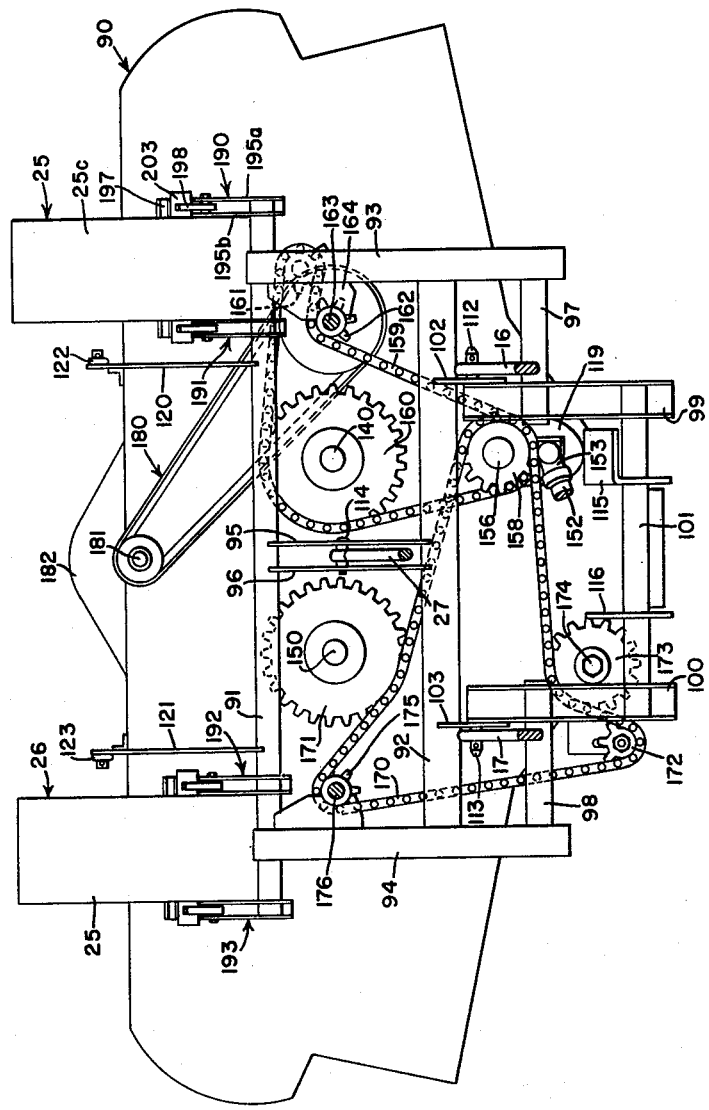
Fig. 3 is a sectional view taken substantially along the lines 3—3 of Fig. 2.
Figure 4:
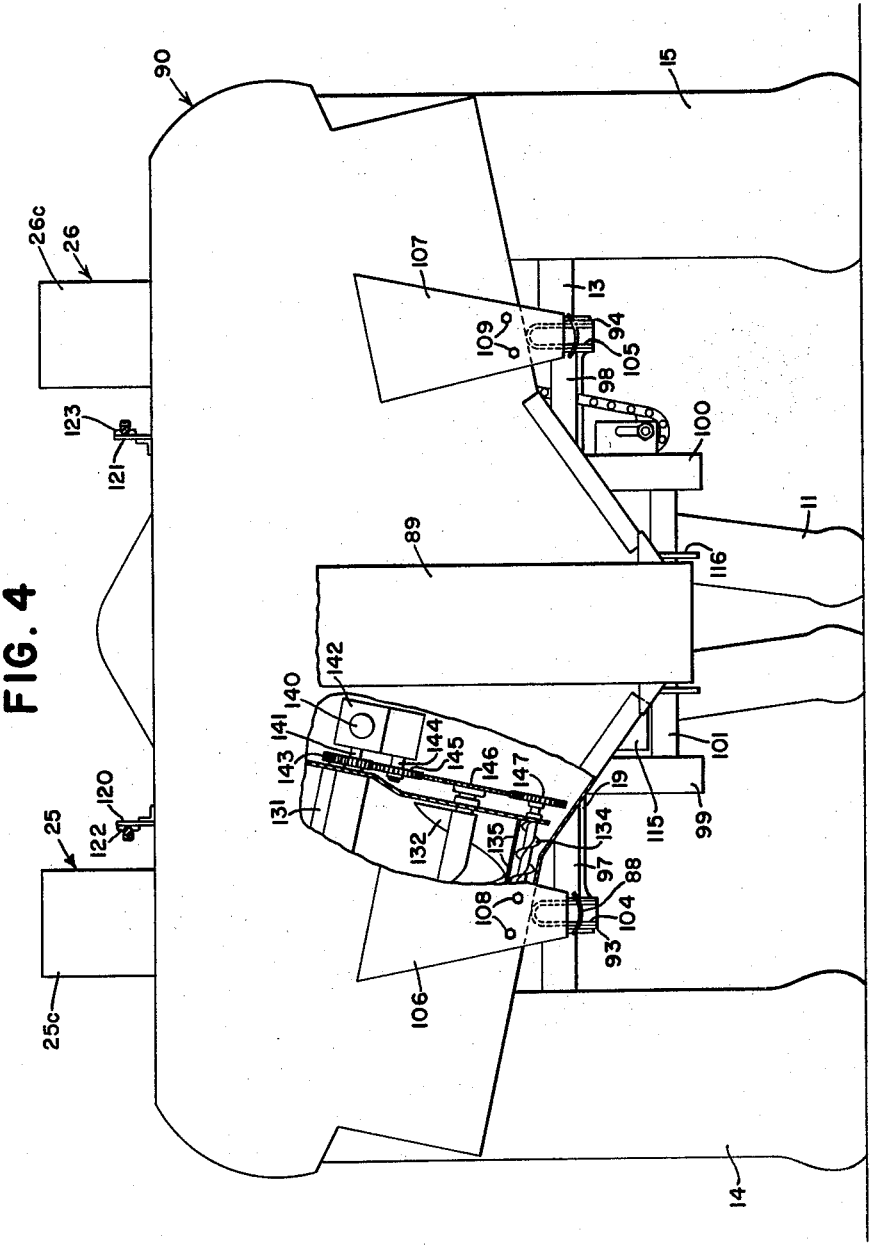
Fig. 4 is a rear view of the tractor and harvester assembly with portions of the harvester housing removed to show the operating mechanism within the husking unit.

Again viewing Figs. 2 and 3, the straps 102, 103, and frame members 99, 100 support transverse pivot pins 112, 113 over which rear ends of the trail behind links or levers 16, 17 may be moved. The upper link 27 is connected to the supporting frame by means of a transverse pivot pin 114 which extends through the straps 94, 96 and through the rearward pivotal end of the link 27. It may be added that the entire framework is a single rigid unit, all connections between the various portions being either welded or otherwise fixedly secured to one another. Extending from the lower transverse tube 101 are a pair of rearwardly extending brackets 115, 116 which are positioned on opposite sides of the wagon elevator and support the transverse elevator drive shaft 117 at the lower end of the elevator. The bracket 115 at the left side of the wagon elevator is formed with a lateral portion 118 which serves as a support for a gear housing 119, the purpose of which will later become apparent.

Fixed to the upper transverse tubular member 91 are a pair of upright brackets 120, 121, the upper end of which are connected tie rods 122, 123 for supporting the rear end of the wagon elevator.

The husking unit herein shown is of a type disposed transversely to the direction of travel and includes housing structure crop inlet openings on opposite ends of the unit adjacent to the discharge portion of the respective row unit. The left intake opening 130 is shown in Fig. 2 on the left end of the husking unit and beneath the discharge portion 25c of the left row unit 25 and the intake opening at the right end of the unit, while not shown specifically, is obviously similarly positioned relative to the discharge portion 26c of the right row unit 26. Exact details of the husking mechanism are not important for a full understanding of the present invention and consequently will be described only generally and relative to the husking mechanism receiving corn from the left row unit 25. The husking mechanism includes a series of husking rolls 131 which are inclined to feed the ears of corn discharging from inlet or opening 130 inwardly and downwardly as the husks are being removed. The husking rolls 131 operate to feed the husks downwardly to an auger conveying means comprising an auger 132 and its auger housing 133 which feed the husks transversely and outwardly of the unit. Directly beneath the husk auger housing 133 is a shelled corn auger 134 which receives incidental kernels of corn shelled in the husking operation and which pass through openings 135 in the husk auger housing 133, and moves them inwardly to be collected in the lower end of the wagon elevator 89.

Power for the husking mechanism is delivered through a fore-and-aft extending shaft 140 which extends through a gear housing 142 which has therein a conventional bevel gear arrangement terminating in a short stub shaft 141 which drives a series of pairs of intermeshing gears 143 which in turn drive the husking rolls 131. Also extending from the gear housing 142 is a short stub shaft 144 having a pinion 145 on it for driving the husk auger gear 146 which drives the shelled corn auger gear 147. As mentioned previously, a similar husking mechanism is provided on the right side of the husking unit and is driven from a drive shaft 150 which corresponds to the drive shaft 140 on the left husking mechanism.

The power for driving the husking mechanisms and the row units is taken directly from the power take-off shaft 24 and includes an input shaft 151 which is connected to the power take-off shaft 24 by means of a power transmitting shaft 152 connected to the input shaft 151 and power take-off shaft 24 by universal joints 153, 154 respectively. The shaft 152 and universal joints 153, 154 provide automatic lengthwise adjustment to compensate for varying vertical positions of the husking unit 90. Power flows through a gear cluster mounted in the gear housing 119 and forwardly through a power shaft 156, the forward end of which has a pair of sprocket members 157, 158 mounted thereon. The left husking mechanism is driven from the sprocket 157 through a chain 159 and sprocket 160, which is mounted on the shaft 140. The chain 159 is also mounted over an idler sprocket 161 and sprocket 162 which drives an output shaft 163. The shaft 163 is supported on the upright frame member 93 by means of a bracket 164. The shaft 163 extends forwardly through a power tube 165 to the left row unit and operates to drive the harvesting mechanism of that unit. The power tube 165 provides a suitable telescoping arrangement to permit effective lengthwise adjustment of the output shaft 163. The forward end of the output shaft 163 is provided with an articulate connection, not shown but of conventional type, which permits relative vertical movement between the row unit 25 and husking unit 90.

The right husking mechanism is driven from the sprocket 158 by means of a chain 170 which drives a sprocket 171 mounted on the drive shaft 150. The chain 170 extends over an idler sprocket 172 and a drive sprocket 173, the latter being mounted on a fore-and-aft extending shaft 174 which operates through a suitable bevel gear arrangement, not shown, to drive the wagon elevator drive shaft 117. The chain 170 also extends over a drive sprocket 175 which is fixed to a forwardly extending output shaft 176 which operates the harvesting mechanism of the right row unit in a manner similar to that described relative to the left power shaft 163.

A V-belt drive extends between the output shaft 163 and a blower drive shaft 181 which operates the blades of a blower mounted under the blower housing 182, the purpose of the blower being to direct blasts of air over the husking rolls.

The crop-treating or husking unit is connected to the rear portions 25c, 26c of the row units to provide a jack-knifing relation between the husking and row units by means of latch assemblies 190, 191, adjacent to opposite sides of the left row unit 25, and 192, 193 adjacent to opposite sides of the right row unit 26. The location of the latch assemblies 190–193 is such as to maintain a substantially constant spacial relation between the discharge ends of the row units and the crop inlets of the husking unit. Typical of all four of the latch assemblies is that shown at 190 and in detail in Figs. 8, 9. The latch 190 is composed of an upright bracket 195 having its lower end fixed to the upper transverse tubular frame member 91. The upper end of the bracket 195 is provided with a forwardly opening semi-circular socket 196. Above the socket 196 is a forwardly extending overhang 197, the forward end of which is flanged upwardly. A latch member 198 is pivotally mounted proximate to and below the socket 196, the pivotal connection being in the form of a bolt and nut combination 199. The latch member 198 is characterized by having a semi-circular socket portion 200 and a forwardly extending lip portion 201. The bracket member is made up of a pair of upright transversely spaced portions 195a, 195b, interconnected at their rear edges by a transverse upright portion 195c. The latch member 198 is mounted on the bracket 195 so as to swing about the transverse bolt 199 and between the upright portions 195a, 195b. Extending outwardly from the latch member 198 is a stop element 202 positioned to engage the forward edge of the bracket 195a. Extending outwardly from the side of the row unit 25 is a rear transverse pivot in the form of a stub shaft 203. As shown in Fig. 8, the latch member 198 and particularly its forwardly extending lip 201 and the upwardly extending flange portion of the overhang 197 operate to form a funnel for receiving the shaft 203 into the socket portions 200 and 196 of the latch member and bracket 195 respectively. As may be seen from Fig. 9, movement of the shaft 203 into the sockets 196, 200 in a rearward direction causes the latch member 198 to swing rearwardly and to close the forward opening of the socket 196. Extending rearwardly from the latch member 198 is a rigid portion 204, the upper surface of which is adapted to engage a locking lever 205. The lever 205 will normally extend over the rearward portion 204 when the latch 198 is in its latched position (Fig. 9). The lever 205 is biased to be retained in its locked position by means of a spring 206. A rearward extension 207 of the overhang 197 is formed with an opening to receive the lever 205 and to provide a surface for the spring 206 to abut against. The extension 207 also has a portion 207a for the lever 205 to rest. As may be seen clearly from Figs. 8 and 9, the latch member 198 may be released by pulling back on the lever 205 until the end of the lever 205 is clear of the portion 204.

The hydraulic lift system for raising the trail behind links 16, 17 is shown schematically in Fig. 5 and comprises a rockshaft 210 on which the rock arm 21 is mounted. Also fixed to the rockshaft 210 is a depending arm 211 the lower end of which is connected to a piston ram 212.

Hydraulic fluid is supplied from a reservoir E and is pumped through line L1 and valve V by means of a pump P to one end of a cylinder C which contains the piston R. A line L2 leading from the head end of the cylinder C permits fluid to pass through a safety valve S which, when opened, will permit fluid to return to the reservoir E. A line L3 leading from the valve V to the reservoir permits fluid to bypass the cylinder C and to return directly to the reservoir E.

The valve V is shown as a plunger type and includes a plunger M. As shown on the sketch, movement of the plunger M to the left, indicated by the arrow U, will tend to move the trail behind links 16 upwardly, while movement of the plunger M to the right, indicated by the arrow D, will tend to move the trail-behind links 16 downwardly. Means for controlling the plunger M is provided in the first instance by manual means which includes a lever 214 which is connected to the lower end of a positioning member 215, the mid-portion of which is connected to the outer end of the plunger M. The lever 214 is connected to the positioning arm 215 through the media of a link 216. The upper end of the positioning arm 215 is connected to the lower end of an arm 217 through a link 218. Inasmuch as the arm 217 is fixed to the shaft 210 the arm 217 and link 218 operate as the second instance for positioning the plunger M relative to the valve V.

In operation, the lever 214 is used primarily for positioning the plunger so as to raise or lower the trail behind links 16, 17 to a suitable position. Should an excess load, however, be applied to the trail-behind links 16, the safety valve S will operate to permit fluid to return to the reservoir E with the ultimate effect that the piston R will move to the left to permit the trail behind links to lower. Lowering of the links 16, 17, will, of course, cause the rockshaft 210 to move in a clockwise direction which will cause the arm 217 and its associated link 218 and positioning arm 215 to move to the left so that the plunger M will permit fluid to again move to the head end of the cylinder C. Upon the overload on the trail-behind link 16 being relieved, the safety valve S will close thereby causing the fluid to be returned in the head end of the cylinder to move the piston to the right and to raise the trail behind links 16, 17. Upon the piston R reaching its initial position as determined by the lever 214, the valve V will again be closed and the trail behind links will be locked in the original desired position. A hydraulic lift mechanism of this type is used primarily to prevent damage to the tractor or its connections to the harvesting unit which would normally be caused by overload or shock load which are momentarily applied on the system.

In operation the husking mechanism is supported solely by the three point hitch linkage comprising the two trail behind links 16, 17 and the upper link 27. The row units 25, 26 are supported at only two positions, that being forwardly of the rear axle 13 by means of the hanger means, previously described, and rearwardly of the axle means by the latch mechanisms 190–193. The harvesting unit, when it is moving over the field, will normally come across depressions and obstructions which cause the husking unit to bounce violently, thereby straining the various connections, links, and hydraulic system on the tractor. In the present mounting arrangement, shock loads will be absorbed within the hydraulic system and a varying degree of vertical movement of the husking unit will occur. By providing the forward hanger type of mounting arrangement, the row units 25, 26 are permitted to move both fore-and-aft and vertically to accommodate the vertical movement of the rear portions 25c, 26c of the row units as affected by the vertical movement of the husking unit. Also, since the input shaft 151 to the husking unit is both articulately connected and adjustable lengthwise and the input shafts running from the husking unit to the respective roll units are both articulately as well as automatically adjustable lengthwise, relative movement between the row units 25, 26 and the husking unit 90 will have no effect upon the normal operation of the entire harvester. Also, raising or lowering of the row units 25, 26 by the hydraulic cylinders 84, 87 will have no effect on the husking unit 90 since the mounting arrangement at the forward end of the row units will compensate for fore-and-aft movement of the row units when the rear portions 25c and 26c are anchored to the husking unit 90.

While only one form of the basic invention has been shown, it should be recognized that such was shown in detail for the purpose of clearly and concisely illustrating the principles of the invention and such should be interpreted in no way as limiting or narrowing the invention beyond the broad general concept herein claimed.

What is claimed is:

1. Attachment means for mounting a crop harvester on a main mobile frame having front and rear portions, said harvester having a forwardly disposed crop harvesting unit with a rear discharge outlet and a rearwardly disposed crop treating unit pivotally connected to the harvesting unit with an inlet receiving crops from the outlet; said attachment means comprising: lever means supported for vertical movement on the rear portion of the frame; lift mechanism mounted on the frame including an hydraulic motor and an associated valve manually adjustable for selective positioning of the lift mechanism and automatically responsive to move to and yield from neutral position in accordance with normal load and momentary overload respectively on the lift mechanism; means hingedly mounting the crop harvesting unit on the forward portion of the frame for relatively free fore-and-aft movement; means mounting the crop treating unit on the lever means; and means connecting said lift mechanism and said lever means for controlling vertical movement of said lever means and for permitting momentary shifting of the harvester from its normal operating position relative to the frame and automatically returning the harvester to the latter position.

2. Attachment means for mounting a crop harvester on a main mobile frame, said harvester having a forwardly disposed crop harvesting unit with a rear discharge outlet and a rearwardly disposed crop treating unit pivotally connected to the harvesting unit with an inlet receiving crops from the outlet; said attachment means comprising: lever means supported for vertical movement on the frame; lift mechanism mounted on the frame including an hydraulic motor and an associated valve manually adjustable for selective positioning of the lift mechanism and automatically responsive to move to and yield from neutral position in accordance with normal load and momentary overload respectively on the lift mechanism; means hingedly mounting the crop harvesting unit on the frame for relatively free fore-and-aft movement; means mounting the crop treating unit on the lever means; and means connecting said lift mechanism and said lever means for controlling vertical movement of said lever means and for permitting momentary shifting of the harvester from its normal operating position relative to the frame and automatically returning the harvester to the latter position.

3. Attachment means for mounting a crop harvester on a main mobile frame having front and rear portions and opposite side portions; the harvester having a pair of forward harvesting units on opposite sides of the frame with a pair of rear crop discharge outlets and a transversely disposed crop treating unit pivotally connected to the harvesting units with transversely spaced crop inlets for receiving crops from the respective discharge outlets, said attachment means comprising: a pair of elevating trail behind links mounted on and projecting rearwardly of the rear portion; lift mechanism mounted on the frame including an hydraulic motor and an associated valve manually adjustable for selective positioning of the lift mechanism and operatively responsive to move to and yield from neutral position in accordance with normal load and momentary overload respectively on the lift mechanism; means hingedly mounting the harvesting units on the front portion of the frame for relatively free fore-and-aft movement, means mounting the crop treating unit on the trail behind links; and means connecting said lift mechanism and said trail behind links for controlling vertical movement of the links and for permitting momentary shifting of the harvester from its normal operating position relative to the frame and automatically returning the harvester to the latter position.

4. The invention defined in claim 3 in which the harvesting units are hingedly mounted on the main frame by means comprising: a stabilizing member positioned under the forward portion of the main frame and having transversely spaced ends proximate to the opposite sides of the main frame; hanger means supporting the stabilizing member on the main frame, the hanger means including means restricting lateral movement of the stabilizing member; and means on the respective ends of the stabilizing member connecting the respective harvesting units to the ends for lateral stability thereof.

5. The invention defined in claim 4 further characterized by power operated means on the main frame selectively adjustable to raise or lower the harvesting units.

6. Attachment means for mounting a crop harvester on a main mobile frame having front and rear portions, the harvester having a forwardly disposed crop harvesting unit and a rearwardly disposed crop treating unit, said units being interconnected by transverse pivot means to provide a jack-knifing relation between the units, the attachment means comprising: a trail behind link supported for vertical movement on the rear portion; lift mechanism mounted on the frame including an hydraulic motor and an associated valve manually adjustable for selective positioning of the lift mechanism and automatically responsive to move to and yield from neutral position in accordance with normal load and momentary overload respectively on the lift mechanism; means mounting the crop treating unit on the trail behind link; means connecting said lift mechanism and said link for controlling vertical movement of the link in response to adjustment of the valve; and means connecting the harvesting unit to the forward portion of the main frame, said latter means being automatically adjustable to accommodate vertical movement of the treating unit.

7. Attachment means for mounting a crop harvester on a tractor having an elongated body carried on transverse axle means, the tractor being further characterized by having a pair of adjustable elevating trail behind links extending rearwardly of the transverse axle means, said corn harvester including: a pair of forwardly extending elongated row units on opposite sides of the tractor body, each of the units having crop discharging portion rearward of the axle means, and a crop treating uni trearward of the axle structure and pivotally connected to the crop treating units, said attachment means comprising: a stabilizing member positioned under the tractor body and having transversely spaced end portions proximate to opposite sides of the tractor body; hanger means adapted for connection to the tractor body for supporting the stabilizing member on the tractor body, the hanger means including means restricting lateral movement of the stabilizing member; support means on the end portions of the stabilizing member for supporting the forward portions of the respective row units, power operated means supported on the tractor and connected to the support means for selectively adjusting the hanger means to raise or lower the row units; and means mounting the crop treating unit on the trail behind links for operational support of the crop treating unit.

8. The invention defined in claim 7 in which the stabilizing member is a transverse shaft and the hanger means is a pair of elongated hanger arms pivotally mounted at one of their ends to the sides of the tractor body for movement fore-and-aft with the opposite ends thereof supporting the shaft; and the support means includes a pair of support arms mounted on the tractor body proximate the respective row units with means thereon connecting the latter arms to the row units; and means connecting the support arms to opposite ends respectively of the shaft for affording lateral support of the support arms by the shaft.

9. The invention defined in claim 8 further characterized by means on said shaft adjacent each of said hanger arms preventing lateral movement of the shaft, said latter means being adjustable axially along said shaft.

References Cited in the file of this patent

UNITED STATES PATENTS

| | | |
|---|---|---|
| 2,379,802 | Hyman | July 3, 1945 |
| 2,507,711 | Hardy et al. | May 16, 1950 |
| 2,647,353 | Dort | Aug. 4, 1953 |
| 2,763,976 | Kenjoski | Sept. 25, 1956 |
| 2,851,841 | Aber et al. | Sept. 16, 1958 |